United States Patent [19]

Tatsuta et al.

[11] Patent Number: 5,745,494
[45] Date of Patent: Apr. 28, 1998

[54] BROADCAST COMMUNICATION METHOD IN RING LAN

[75] Inventors: Akihiro Tatsuta, Nara; Yasuo Nagaishi, Ikoma; Koichiro Tanaka, Katano; Tomonori Shiomi, Hirakata, all of Japan

[73] Assignee: Matsushita Electric Industrial Co., Ltd., Osaka, Japan

[21] Appl. No.: 859,774

[22] Filed: May 21, 1997

Related U.S. Application Data

[63] Continuation of Ser. No. 511,852, Aug. 7, 1995, abandoned.

[30] Foreign Application Priority Data

Aug. 8, 1994 [JP] Japan ................... 6-185954

[51] Int. Cl.$^6$ .................... H04L 12/403; H04L 12/42
[52] U.S. Cl. ............................... 370/452; 370/432
[58] Field of Search .................... 370/450, 451, 370/452, 460, 449, 432; 340/825.05, 825.08, 825.54, 825.52; 371/32, 33, 34; 341/94

[56] References Cited

U.S. PATENT DOCUMENTS

| | | | |
|---|---|---|---|
| 4,901,313 | 2/1990 | Fujikura et al. | 370/95.1 |
| 4,914,654 | 4/1990 | Matsuda et al. | 370/94.1 |
| 5,499,247 | 3/1996 | Matsuda et al. | 370/85.3 |

OTHER PUBLICATIONS

Local and Metropolitan Area Networks by William Stallings, Fourth Edition, pp. 186,187, 1993.

"Local and Metropolitan Area Network" by W. Stallings 1993 pp. 73–77.

*Primary Examiner*—Douglas W. Olms
*Assistant Examiner*—Ajit Patel
*Attorney, Agent, or Firm*—Wenderoth, Lind & Ponack

[57] ABSTRACT

A data frame which is transmitted from a transmitting station is provided with an individual response part (RS) having response bits (S1 to SN) corresponding to all stations on a network, so that the transmitting station initializes the individual response part (RS) in data transfer. Each receiving station outputs its own state to a prescribed position of the individual response part, and the transmitting station monitors the individual response part. Thus, it is possible to correctly confirm whether or not the data is normally transferred to those of the receiving stations which are to receive data.

2 Claims, 3 Drawing Sheets

BROADCAST COMMUNICATION METHOD
IN RING LAN

This application is a continuation of now abandoned application, Ser. No. 08/511,852, filed Aug. 7, 1995 now abandoned.

BACKGROUND OF THE INVENTION

1. Field of the Invention

The present invention relates to a broadcast communication method in a ring LAN system, and more specifically, it relates to a transmission confirming method for broadcast communication which is made in a ring LAN system.

2. Background of the Invention

In a conventional in-house broadcast system, a broadcasting unit and speaker units which are provided in proper positions of respective stories, rooms etc. on the premises are wired independently of each other. In emergency announcement of a fire alarm or the like, it is necessary to quickly confirm whether or not sound information is received by every speaker unit. When the sound information from the broadcasting room is received, each speaker unit transmits a response signal to the broadcasting unit through an individual wire. The broadcasting unit confirms transmission of the sound information to each speaker unit on the basis of the response signal, and retransmits the sound information to those speaker units not yet receiving the same or informs the people in charge of the situation. Thus, the emergency information is reliably transmitted.

When the broadcasting unit and the respective speaker units are wired independently of each other in the aforementioned manner, however, the wire lengths are substantially increased, leading to a high construction cost and a long construction period. To this end, it may be possible to reduce the cost and shorten the construction period by connecting the broadcasting unit with the speaker units in the form of a ring through the so-called ring LAN (local area network).

FIG. 6 illustrates a frame structure of a token ring LAN, regarded as a typical ring network, which is described in U.S. ANSI/IEEE Std. 802.5, for example. Referring to FIG. 6, a single frame is formed by an information part I, delimiter parts SD and ED for the information part I, and a frame state part FS. The frame state part FS includes address recognition bits A, frame receiving bits C, and spare bits r.

A communication system in the conventional token ring LAN is now described. First, the transmitting station sets each address recognition bit A and each frame receiving bit C at zero, to transmit data. Each receiving station sets the address recognition bit A at 1 when the same recognizes that the data is directed thereto, and sets the frame receiving bit C at 1 when the same succeeds in incorporation of the data. Consequently, the transmitting station can detect the following states from the values of the address recognition bit A and the frame receiving bit C:

A=0 and C=0: The data has been received by no receiving station, or the receiving station is out of order.

A=1 and C=0: The receiving station has failed in data incorporation, or the data has not yet been completely incorporated.

A=1 and C=1: The receiving station has succeeded in data incorporation.

When the destination from the transmitting station is a group address or a global address which is directed to a plurality of receiving stations, i.e., broadcast communication is made in the aforementioned conventional communication system. However, it is not clear whether or not all of the target receiving stations have succeeded in data incorporation even if A=1 and C=1. When the aforementioned token ring LAN communication system is applied to the aforementioned in-house broadcast system, therefore, it is disadvantageously impossible to confirm whether or not sound information is received by each speaker unit upon simultaneous in-house broadcasting, for example.

SUMMARY OF THE INVENTION

An object of the present invention is to provide a communication method which can recognize whether or not all receiving stations have been succeeded in data incorporation in broadcast communication between a transmitting station and a plurality of receiving stations.

According to the present invention, a data frame which is transmitted from the transmitting station is provided with an individual response part corresponding to all stations on the network, so that the transmitting station initializes the individual response part when the same transfers data. Each receiving station outputs its own state to a prescribed position of the individual response part. Thus, the transmitting station can individually confirm whether or not the data is normally transferred to every receiving station which is the target of the data transfer even in the case of broadcast communication, by monitoring the individual response part.

According to the present invention, the contents forming the individual response part in the data frame which is transmitted from the transmitting station may be temporally fixed. In this case, it is possible to immediately confirm arrival of the data at each receiving station when the data frame comes full circle to the transmitting station through the ring network. Alternatively, the contents forming the individual response part in the data frame which is transmitted by the transmitting station may be temporally changed. In this case, the bit number in the individual response part can be reduced even when the network is provided with a large number of terminals. Further, the data frame which is transmitted from the transmitting station may be provided with the individual response part only when data is simultaneously transferred from a single transmitting station to a plurality of receiving stations, i.e., only in a case of broadcast communication.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
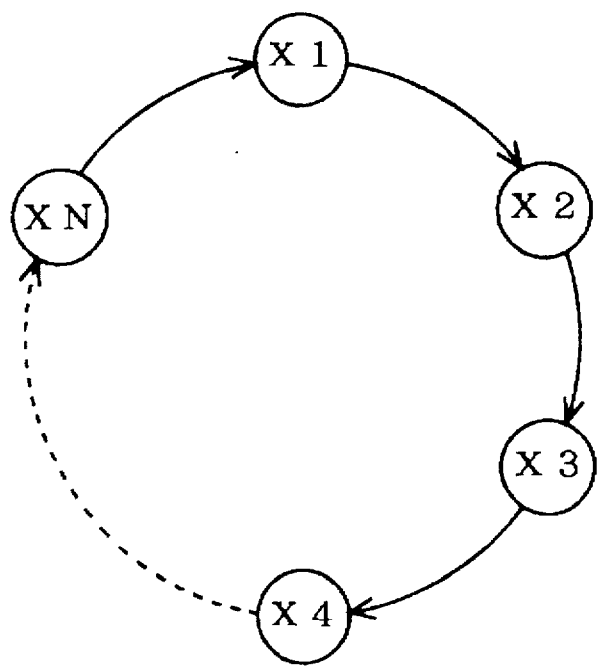
FIG. 1 illustrates the structure of a ring LAN according to a first embodiment of the present invention.

FIG. 1 illustrates the structure of a ring LAN according to a first embodiment of the present invention.

Referring to FIG. 1, N terminals X1 to XN are connected with each other in the form of a ring in this ring LAN. Each of the terminals X1 to XN comprises transmitting and receiving functions. When this ring LAN is applied to an in-house broadcast system, each terminal is provided with a speaker unit and/or a microphone unit.

Figure 2:
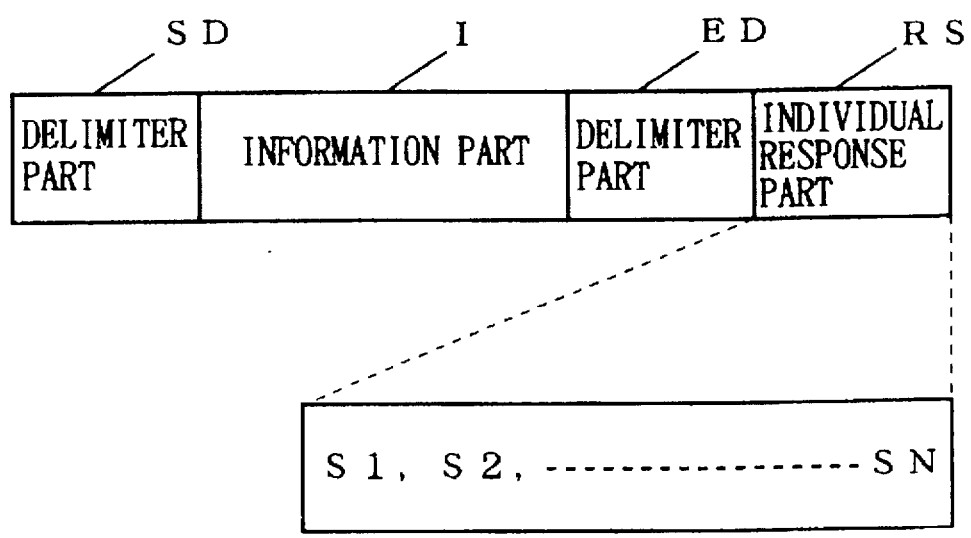
FIG. 2 illustrates a data frame structure which is employed in the first embodiment of the present invention.

FIG. 2 illustrates a data frame structure which is employed in the ring LAN according to the first embodiment of the present invention. Referring to FIG. 2, a single frame is formed by an information part I, delimiter parts SD and ED, and an individual response part RS. The individual response part RS includes response bits S1, S2, . . . , SN corresponding to all stations (N stations) on the network.

An operation for making broadcast communication in the aforementioned ring LAN according to the first embodiment is now described. It is assumed here that a transmitting station X1 simultaneously transfers data to three receiving stations X2, X5 and X7, for example. First, the transmitting station X1 sets response bits S2, S5 and S7 of the individual response part RS corresponding to the receiving stations X2, X5 and X7 at zeros respectively, and transfers the data. The receiving stations X2, X5 and X7 convert the response bits S2, S5 and S7 to 1 respectively when the same succeed in incorporation of the data from the transmitting station X1. Consequently, the transmitting station XI can detect the following states from the values of the response bits S2, S5 and S7:

S2=S5=S7=0: All receiving stations have not yet completed data incorporation.

S2=1 and S5=S7=0: Only the receiving station X2 has completed data incorporation.

S5=1 and S2=S7=0: Only the receiving station X5 has completed data incorporation.

S7=1 and S2=S5=0: Only the receiving station X7 has completed data incorporation.

S2=S5=1 and S7=0: Only the receiving station X7 has not yet completed data incorporation.

S2=S7=1 and S5=0: Only the receiving station X5 has not yet completed data incorporation.

S5=S7=1 and S2=0: Only the receiving station X2 has not yet completed data incorporation.

S2=S5=S7=1: All receiving stations have completed data incorporation.

According to the first embodiment, as hereinabove described, the data frame which is transmitted from the transmitting station is provided with an individual response part corresponding to all stations on the network, so that the transmitting station can confirm whether or not data is normally transmitted to all receiving stations by monitoring the values thereof.

Figure 3:
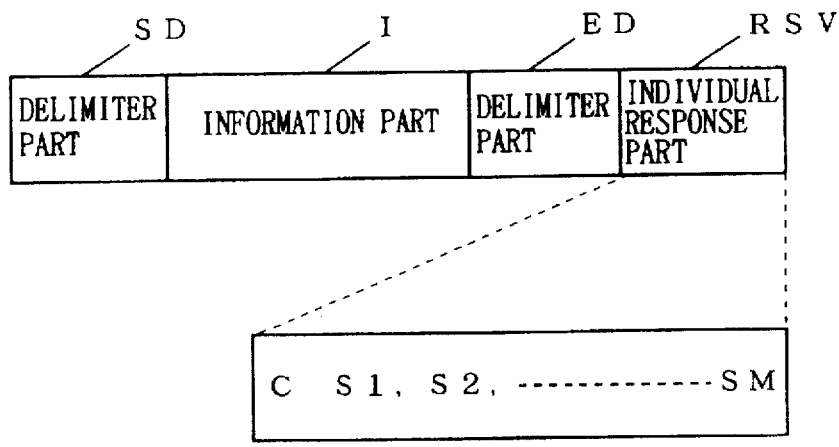
FIG. 3 illustrates a data frame structure which is employed in a second embodiment of the present invention.
Figure 4:
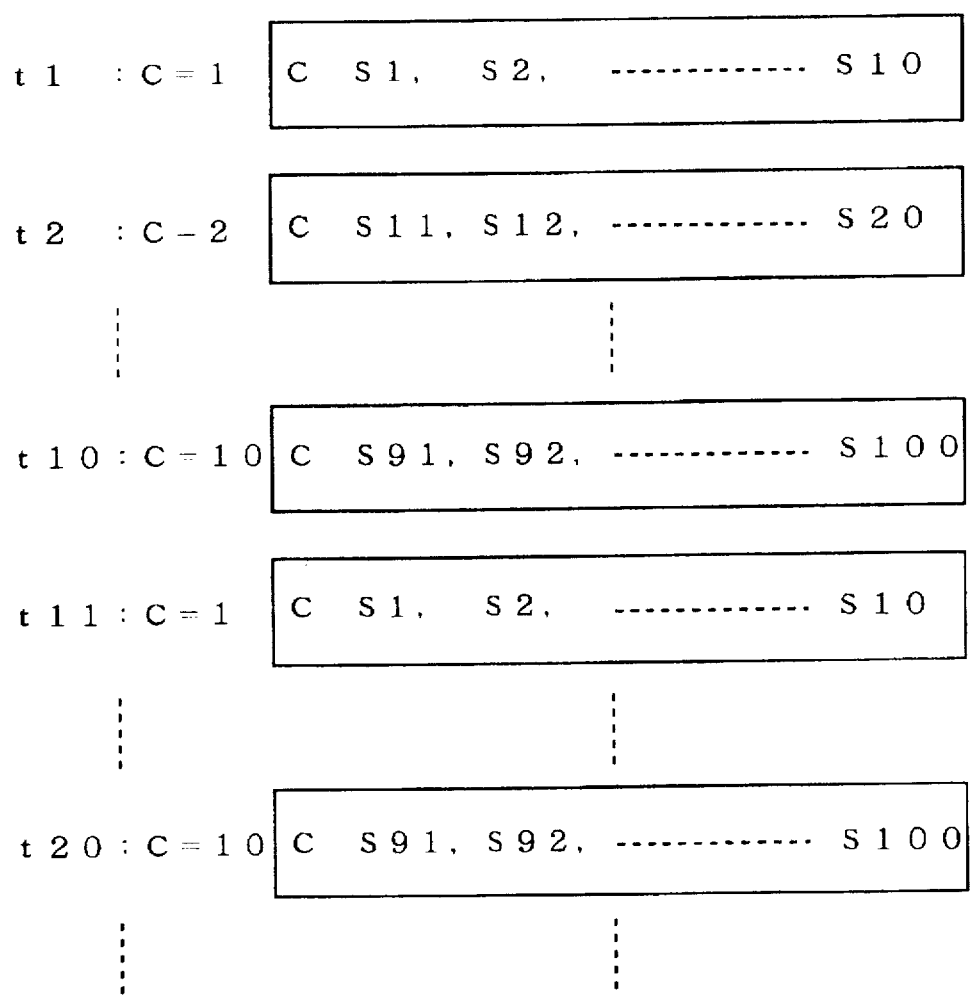
FIG. 4 illustrates states of temporal changes of an individual response part RSV shown in FIG. 3.

FIG. 3 illustrates a data frame structure which is employed in a ring LAN according to a second embodiment of the present invention. Referring to FIG. 3, a single frame is formed by an information part I, delimiter parts SD and ED, and an individual response part RSV. The individual response part RSV includes a counter bit C, and M response bits S1 to SM. As shown in FIG. 4, the value of the counter bit C is temporally changed, and the correspondence between the individual response part RSV and each terminal is varied with the value of the counter bit C.

An operation for making broadcast communication in the ring LAN according to the second embodiment is now described with reference to FIG. 4. It is assumed here that the total number N of the terminals is 100, and the number M of the response bits in a single frame is 10, for example.

Further, it is assumed that a transmitting station X1 simultaneously transfers data to two receiving stations X2 and X18.

At a time t1, the transmitting station X1 first sets the value of the counter C at 1. At this time, 10 response bits S1 to S10 correspond to terminals X1 to X10 respectively. Therefore, the transmitting station X2 sets the response bit S2 corresponding to the receiving station X2 at zero, and transmits the data. The receiving station X2 converts the response bit S2 corresponding thereto to 1 when the same succeeds in incorporation of the data from the transmitting station X1. The transmitting station X1 detects whether or not the data is normally transferred to the receiving station X2 from the value of the response bit S2.

At a time t2, the transmitting station X1 sets the value of the counter C at 2. At this time, 10 response bits S11 to S20 correspond to terminals X11 to X20 respectively. Therefore, the transmitting station X1 sets the response bit S18 corresponding to the receiving station X18 at zero, and transmits the data. The receiving station X18 converts the response bit S18 corresponding thereto to 1 when the same succeeds in incorporation of the data from the transmitting station X1. The transmitting station X1 detects whether or not the data is normally transferred to the receiving station X18 from the value of the response bit S18.

Thereafter the transmitting station S1 repeatedly executes operations similar to the above, to transmit the data up to a final response bit S100 of the individual response part RSV. Further, the transmitting station X1 repeats the aforementioned series of operations a plurality of times (L times). In other words, the transmitting station X1 transmits the response bits S2 and S18 to the receiving stations X2 and X18 L times respectively, and confirms whether or not the data is successively transferred to the receiving stations X2 and X18 within the L transmissions.

According to the second embodiment, as hereinabove described, the data frame which is transmitted from the transmitting station is provided with an individual response part temporally changing correspondence to each station on the network, whereby the number of the response bits provided in the individual response part can be reduced even when the network is provided with a large number of terminals. Further, the transmitting station can confirm whether or not data is normally transmitted to all receiving stations in broadcast communication by monitoring the values of the respective response bits.

Figure 5:
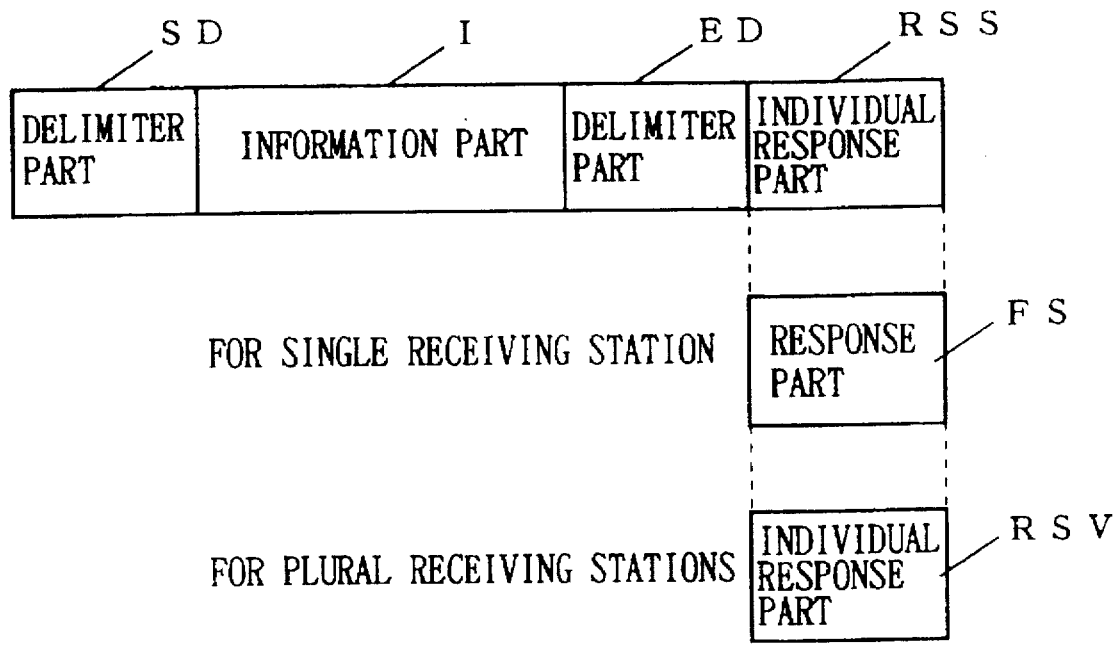
FIG. 5 illustrates a data frame structure which is employed in a third embodiment of the present invention.
Figure 6:
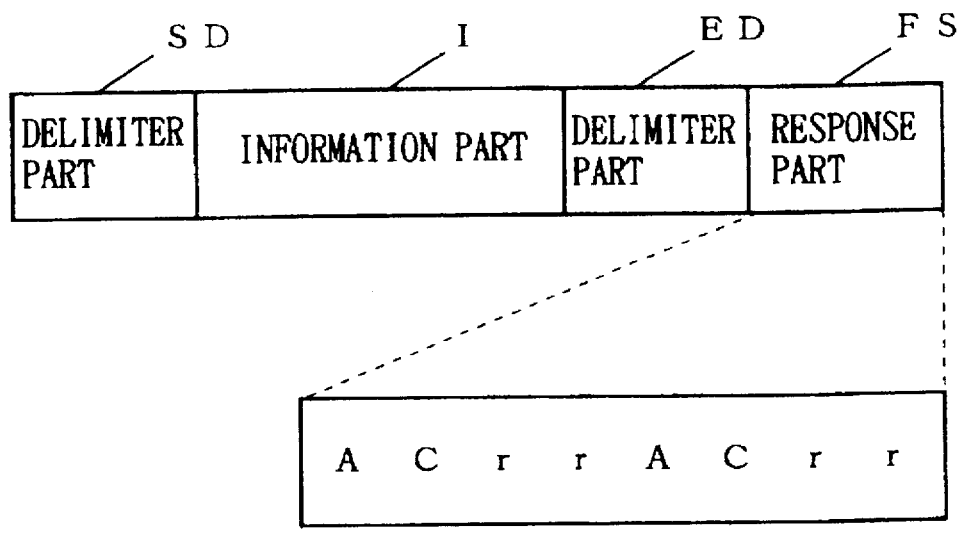
FIG. 6 illustrates a data frame structure which is employed in a conventional ring LAN.

FIG. 5 illustrates a data frame structure which is employed in a ring LAN according to a third embodiment of the present invention. Referring to FIG. 5, a single frame is formed by an information part I, delimiter parts SD and ED, and an individual response part RSS. The individual response part RSS takes the aforementioned structure described with reference to the individual response part RSV of the second embodiment when data is transmitted to a plurality of receiving stations, while the same takes a structure which is equal to that of the conventional individual response part FS in other case, i.e., when data is transmitted to a single receiving station. The number of the receiving station(s) is decided by the contents of the information part I. When the information part I includes destinations of a plurality of receiving terminals for making broadcast communication, the transmitting terminal carries out an operation which is similar to that of the second embodiment. In the other case, the transmitting terminal caries out an operation which is similar to that of the prior art described with reference to FIG. 6.

According to the third embodiment, as hereinabove described, the data frame which is transmitted from the transmitting station is provided with an individual response part corresponding to each receiving station on the network only in broadcast communication, so that the transmitting station can confirm whether or not data is normally transmitted to all receiving stations by monitoring the values thereof.

While each response bit has a length of 1 bit so that its value is set at zero in transmission and converted to 1 upon succession of data incorporation in each of the first and second embodiments, the response bit may alternatively have a length of two or more bits, for providing such a state that each receiving station recognizes data which is directed thereto, in addition to the two states of complete data incorporation and incomplete data incorporation, similarly to the prior art. Further, new states may be added in response to the number of bit patterns which can be taken by each response bit.

While each of the above embodiments has been described with reference to a ring LAN which is mainly employed for an in-house broadcast system, the present invention is not restricted to this but is also applicable to a ring LAN which is employed for another system for transmitting images or data, as a matter of course.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A broadcast communication method for simultaneously transferring data from one transmitting station to a plurality of receiving stations in a ring LAN, said method comprising:

transmitting a data frame from said transmitting station, said data frame being provided with an individual response part corresponding to all said stations on said ring LAN, wherein said transmitting station initializes said individual response part in data transfer;

outputting from each said receiving station a corresponding state of each receiving station to a prescribed position of said individual response part; and monitoring by said transmitting station said individual response part to determine whether or not said data is normally transmitted to those of said receiving stations for receiving said data;

wherein the contents forming said individual response part in said data frame being transmitted by said transmitting station are temporally changed.

2. A broadcast communication method for simultaneously transferring data from one transmitting station to a plurality of receiving stations in a ring LAN, said method comprising:

transmitting a data frame from said transmitting station, said data frame being provided with an individual response part corresponding to all said stations on said ring LAN, wherein said transmitting station initializes said individual response part in data transfer;

outputting from each said receiving station a corresponding state of each receiving station to a prescribed position of said individual response part; and monitoring by said transmitting station said individual response part to determine whether or not said data is normally transmitted to those of said receiving stations for receiving said data;

wherein said data frame transmitted from said transmitting station is provided with said individual response part, corresponding to all said stations on said ring LAN, only when said data is transferred from one said transmitting station to a plurality of said receiving stations.

* * * * *